Nov. 25, 1924.　　　　　　　　　　　　　　　　　　1,516,668
F. R. BURCH
WINDMILL
Filed June 4, 1923　　　2 Sheets-Sheet 2
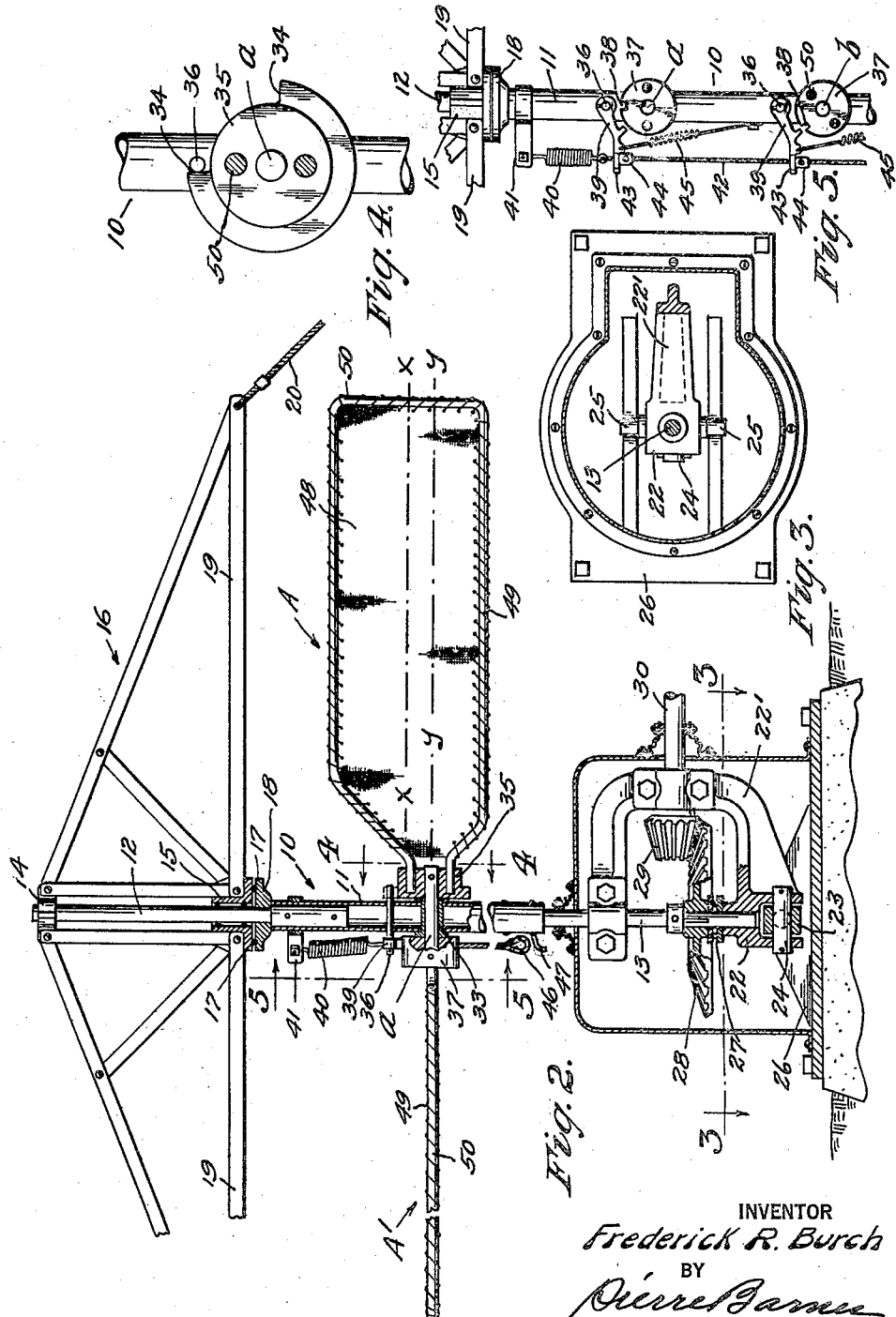
INVENTOR
Frederick R. Burch
BY
ATTORNEY Patented Nov. 25, 1924.

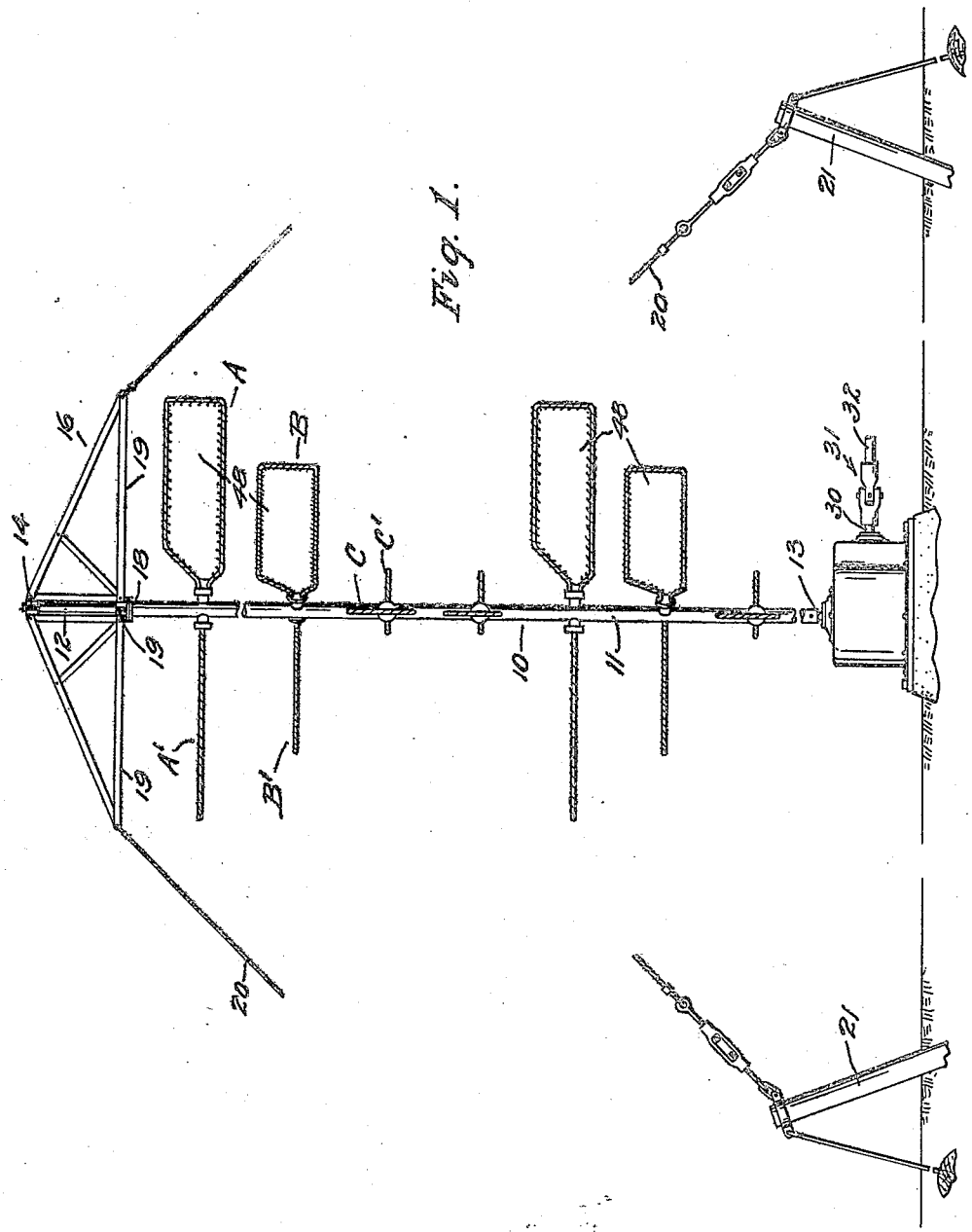

1,516,668

UNITED STATES PATENT OFFICE.

FREDERICK R. BURCH, OF SEATTLE, WASHINGTON.

WINDMILL.

Application filed June 4, 1923. Serial No. 643,247.

*To all whom it may concern:*

Be it known that I, FREDERICK R. BURCH, a citizen of the United States, residing at Seattle, in the county of King and State of Washington, have invented certain new and useful Improvements in Windmills, of which the following is a specification.

This invention relates to windmills of the type having feathering wings or vanes.

The object of the invention, generally, is the improvement in the construction of windmills of this character to enable the same to be efficiently applied in large power generating installations.

More specific objects and advantages of the invention will appear in the following description.

The invention consists in the novel construction, adaptation and combination of parts hereinafter described and claimed.

In the accompanying drawings,—

Figure 1 is an elevational view of apparatus embodying the present invention. Fig. 2 is a fragmentary transverse vertical section of the same to an enlarged scale, illustrating details not shown in Fig. 1. Figs. 3, 4 and 5 are sectional views through 3—3, 4—4 and 5—5 of Fig. 2, Fig. 5 showing two vane attachments instead of one as in Fig. 2, for the purpose of illustrating the action of the locking devices.

My improved windmill is provided with a substantially vertical shaft 10 having, preferably, a central tubular portion 11 with gudgeon elements 12 and 13 at its top and bottom ends, respectively.

The upper gudgeon 12 is journaled in hub elements 14 and 15 of a non-rotatable frame 16 which is supported upon anti-friction balls 17 provided in a ball race of a collar 18 upon said shaft. The frame 16, hereinafter designated as the spider, is provided with a plurality of arms such as 19 disposed radially of the shaft axis, said arms being connected by stays 20 with anchor posts 21, Fig. 1, for securing the upper end of the shaft against excessive lateral movement. The lower gudgeon element 13 of the shaft is journaled in a bearing provided therefor in the member 22 of gimbal devices, see Figs. 2 and 3, which includes a second member 23.

The two gimbal members 22 and 23 are connected together by a horizontal shaft 24 disposed at right angles to trunnions 25 provided on the member 23, said trunnions being journaled in bearings of a foundation casting 26.

The rocking motion afforded by the shaft 24 and trunnions 25, constitutes an important feature of the present invention by permitting swaying motion to the shaft 10 subject to the restraining action of the frame 16 and the stays 20. The shaft 10 is desirably supported upon the gimbal member 22 through the medium of anti-friction bearings which are indicated, generally, by 27. Power is transmitted from said shaft 10 through the medium of bevel toothed-gears 28 and 29, of which the gear 28 is keyed or otherwise secured to the shaft and the complementary gear 29 is secured to a stub shaft 30 which is journaled in a bearing provided therefor in a bracket arm $22^1$ of the gimbal member 22.

As shown in Fig. 1, the stub shaft 30 is connected by a universal coupling 31 with a shaft 32 through which power is transmitted to perform work.

Rotatably mounted in the shaft 10 and radially thereof is a plurality of duplex wings or vanes, such as A—$A^1$, B—$B^1$, C—$C^1$, etc., the respective pairs of which are rigid with horizontal rocker shafts $a$, $b$, etc., which are mounted in bushings 33 disposed diametrically of the shaft and have their ends disposed in helical relations with each other longitudinally of the shaft.

The companion wings of each pair thereof are disposed at right angles to each other. The wings are arranged, moreover, to have the medial axis, as $x$—$x$ Fig. 2, of each wing in offset relations with respect to the axis indicated by $y$—$y$ of the respective rocker shaft, thereby rendering the wings unbalanced with respect to the rocker shaft axes whereby wind pressures acting against the wings successively tends to swing one wing of a pair into a vertical plane and the companion wing into a horizontal plane or into a feathering relation with respect to the wind.

The turning of each pair of wings about its swivel connection with the shaft 10 is limited to one-fourth of a rotation through the instrumentality of peripherally spaced shoulders 34 (see Fig. 4) provided on fixed collars 35 of the respective rocker shafts encountering the protruding ends of stop pins 36 secured in the shaft 10. Provided on the end of each rocker shaft opposite to a collar 35, is a second collar 37 having in its periphery a notch 38 (see Fig. 5) to receive upon occasion the detent element of a dog 39 which is pivotally connected to the adjacent stop pin 36. The notches and dogs above mentioned are arranged for releasably securing the rocker shafts in rotary positions to retain the wings thereof when unemployed at angles of approximately forty-five degrees from a vertical plane whereby the companion wings of the various rocker shafts will balance each other with respect to any tendency of the wind to revolve the same.

40 represents an extensible spring depending from a bracket 41 provided on the shaft 10, the lower end of the spring being connected to a controlling cable 42 which passes through slots provided in arm extensions 43 of the respective dogs 39.

Provided on the cable 42 below the respective dog arms 43 are attachments, such as 44 in Fig. 5, for normally retaining the dogs out of engaging relations with the notches 38 therefor.

45 represent springs, one for each dog, which upon the withdrawal of the cable attachments 44 serve to individually draw the dogs against the respective collars 37 and ultimately into engagement in the notches 38 when the latter are revolubly brought into register therewith. The combined power of the springs 45, however, is less than the power of the spring 40.

As shown in Fig. 2, the lower end of the controlling cable 42 is provided with a loop 46 which is engageable with a hook 47, or equivalent, for retaining the cable attachments 44 in retracted relations with respect to the dogs.

With the attachments thus retracted, the springs 45 influence the dogs to lock the wings in their neutral or inoperative positions.

When the cable is released from its engagement with the hook 47 the superior power of the master spring 40 acts to disengage the dogs and allow the wings to function.

The wings of the windmill are desirably of light construction and may advantageously each be made of a sail element 48 of canvas, or an equivalent, which is secured in a taut condition by means of a lacing 49 to an enclosing frame 50 which, in turn, is rigidly secured to a collar 35 or 37 as shown, for example, in Fig. 2. The gimbal support for the shaft 10, or axis of the mill, accommodates itself to any swaying or inclinations of the shaft as will occur without the use of a rigid frame or standard which is practically prohibitive with tall structures.

The construction and operation of the invention will, it is thought, be understood from the foregoing description.

It is to be noted, however, that the present invention with the absence of any rigid frame or tower support for the windmill proper, can be constructed and maintained at a comparatively small cost. Furthermore, the absence of such a frame or tower, enables the construction of a windmill which will extend a considerable distance upwardly into wind strata which hitherto have been unavailable for driving a wind-propelled motor.

The gimbal or universal support for the shaft 10 accommodates itself to swaying movements or inclinations of said shaft which permits the upper end of the shaft being held by a stay controlled spider frame which is sustained by the rotatable shaft which carries the wind propelled wings.

While I have illustrated and explained an embodiment of the invention now preferred by me, I do not wish to be understood as confining myself specifically thereto, as changes may be made within the scope of the following claims without departing from the spirit of the invention.

What I claim, is:—

1. In a windmill of the character described, an upright shaft, wings revolubly carried thereby, gimbal supporting means provided at the lower end of the shaft and means supported by the shaft above said wings for retaining the shaft in a substantially vertical position.

2. In a windmill of the character described, an upright shaft, a frame supported thereby, means operatively connected with a base to support said shaft and frame and formed to afford conjoint oscillatory movements thereto, and means connected to said frame to limit the oscillatory movements thereof and retain the shaft in a substantially vertical position.

3. In a windmill having an upright shaft revolubly carrying feathering wing members, an oscillatory journal-bearing member for the lower end of the shaft, a second shaft disposed in angular relations to the first named shaft and journalled in said member, and gear connections between said shafts for driving the second named shaft.

4. In a windmill of the character described, an upright shaft, a member supporting said shaft and provided with a journal bearing for the lower end of the same, a second member, a foundation support for the second member, means connecting said members with each other and means connecting the second member to the foundation support to afford universal oscillatory movements to the shaft, and means supported by the shaft for retaining the latter in a substantially vertical position.

5. In a windmill of the character described, the combination with a vertical shaft, and a series of wings carried by said shaft and arranged for rotation for approximately ninety degrees about axes radially of said shaft, of relatively independent simultaneously operable means to releasably secure said wings from rotary movements about their respective axes.

6. In a windmill of the character described, the combination with a vertical shaft, and pairs of wings carried by said shaft and respectively rotatable about axes extending diametrically of the shaft, the complementary wings of each pair thereof being disposed at right angles to each other, means to limit the rotary movements of said wings to approximately ninety degrees, independent locking devices releasably securing all of said wings at angles approximately forty-five degrees from a horizontal plane, and means for controlling said locking devices to simultaneously disengage the same with respect to the wings.

7. In a windmill of the character described, the combination with a vertical shaft, and pairs of wings carried by said shaft and respectively rotatable about axes extending diametrically of the shaft, the complementary wings of each pair thereof being disposed at right angles to each other, means to limit the rotary movements of said wings to approximately ninety degrees, and means for releasably securing all of the wings in planes which bisect the angles of their rotary movements about the respective axes.

8. The combination with the rotary vertical shaft, and a series of wings extending radially therefrom at different elevations, independent means to limit the rotation of said wings about axes diametrically of the shaft, and means for simultaneously and releasably securing the wings from rotation about the respective axes thereof.

9. In a windmill of the character described, the combination with a vertical shaft, horizontal shafts carried thereby and provided with a wing element at each side of the vertical shaft, the complementary wings of each horizontal shaft being disposed at right angles to each other, manually controlled means for locking the horizontal shafts in rotary positions to retain the respective wings at angles approximating forty-five degress from the horizontal, and means to disengage the locking means simultaneously with respect to all of the horizontal shafts.

10. In a windmill of the character described, a rotary vertical shaft, horizontal shafts carried by said vertical shaft and provided with a wing at each side of the latter, the wings of each horizontal shaft being disposed at right angles to each other, spring actuated dogs for releasably securing the horizontal shafts and the wings thereof in predetermined rotary positions, and means whereby said dogs are yieldingly held in their disengaged positions.

11. The combination in a windmill having a driving shaft and a driven shaft, of gimbal means connected with and forming a support for said shafts, and transmission means independent of said gimbal means for operatively connecting the two shafts whereby to maintain the continuity of power transmission irrespective of the action of said gimbal means.

12. The combination in a windmill having a normally vertical driving shaft and a normally horizontal driven shaft, of gimbal means positively connected with and forming a support for said shaft, and transmission mean independent of said gimbal means for operatively connecting the two shafts whereby to maintain the continuity of power transmission irrespective of the action of said gimbal means, said transmission means including intermeshing gears carried respectively by the driving and driven shafts.

13. The combination in a windmill having a normally vertical driving shaft and a driven shaft, said driving shaft being provided with a plurality of wings, of gimbal means connected with and forming a support for said shafts. transmission means independant of said gimbal means for operatively connecting the two shafts whereby to maintain the continuity of power transmission irrespective of the action of said gimbal mean, and means connected with said driving shaft for normally maintaining the same in a vertical position.

Signed at Seattle, Washington. this 23rd day of May, 1923.

FREDERICK R. BURCH.

Witnesses:
PIERRE BARNES,
M. G. SUPPLE.